Figure 1:
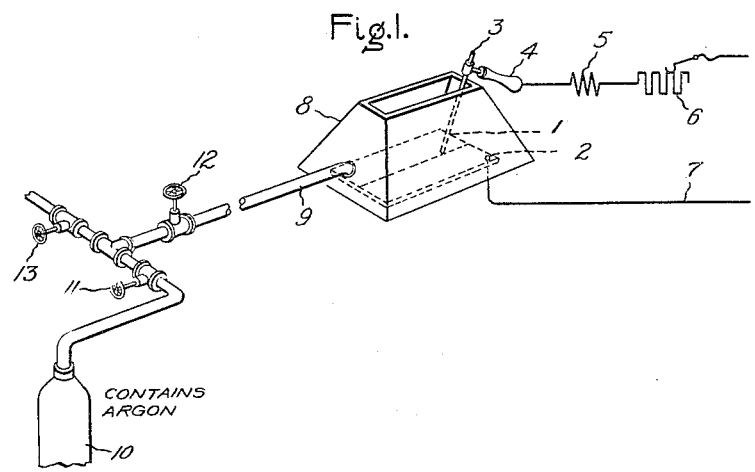

Feb. 4, 1930.  P. K. DEVERS  1,746,191

ARC WELDING

Filed June 25, 1926

Inventor:
Philip K. Devers,
by
His Attorney.

Patented Feb. 4, 1930

1,746,191

UNITED STATES PATENT OFFICE

PHILIP K. DEVERS, OF LYNN, MASSACHUSETTS, ASSIGNOR TO GENERAL ELECTRIC COMPANY, A CORPORATION OF NEW YORK

ARC WELDING

Application filed June 25, 1926. Serial No. 118,605.

My invention relates to certain improvements in methods of fusing metals by the electric arc process. More particularly, my invention relates to electric arc welding in the presence of argon.

As has been disclosed, for example, in the application of Peter P. Alexander, Serial No. 758,082, filed December 26, 1924, for methods and apparatus for electric arc welding, assigned to the same assignee as the present application, it is possible to produce ductile welds by the electric arc process, if the operation is performed in the presence of hydrogen. The critical voltage of an arc in hydrogen is about 38 volts and a voltage of at least 120 volts is necessary to strike and maintain such an arc where direct current is used. This high arc voltage is advantageous where a large amount of energy is desired in the arc as, for example, where work of considerable thickness is to be welded and the greater energy in the arc also permits high speeds of welding. The striking voltage of the arc, however, is in excess of the voltages usually furnished by commercial machines built for carrying on the welding operation in air, and it is not always possible to adapt these machines readily to the above process. I have found that if a small amount of argon which is an easily ionized chemically inert gas be added to the hydrogen, the striking voltage is reduced so that machines having an open circuit voltage of 60 volts or less may be used. The addition of approximately from 3% to 5% of argon is sufficient for this purpose. The arc voltage in this mixture is substantially the same as in pure hydrogen, and the benefits of greater energy in the arc permitting greater penetration and higher speeds of welding are retained while the striking voltage is reduced to such an extent that the usual open circuit voltages of around 60 volts are ample.

It is also possible to improve the quality of the weld metal over welding in air if the welding operation is performed in an enveloping atmosphere of argon. In this gas the molten metal of the weld is protected by an absolutely chemically inactive gas which will prevent the formation of compounds such as oxides and nitrides which are detrimental to the weld. The striking voltage in argon is exceedingly low, 20 volts being ample to strike and maintain the arc. The arc voltage is slightly lower than in air, the average being about 15 volts. It is possible to maintain the arc with very small currents even down to 5 amperes. I have used as low as 15 or 16 amperes with no difficulty whatever. The proportion of heat produced at the cathode is very low and it is likewise low at the anode, but not so strikingly low. The deposit of metal in argon is very slow. Because of the low energies obtainable welding in argon is particularly good for thin metals. As the gas is nonexplosive, harmless, and invisible, it is safe to use and does not interfere with the vision of the operator or attendant.

Under certain conditions where it may be difficult absolutely to exclude the oxygen and nitrogen of the air from the arc and molten portions of the metal it may prove desirable to add a small amount of hydrogen or other reducing element to the argon to render the atmosphere about the arc and molten portions of the metal actively reducing and thus neutralize any oxygen present. It is to be understood, however, that under the proper conditions it is practicable to produce ductile welds in the presence of argon alone.

It already has been proposed to improve the quality of welds made by the arc process by performing the operation in an enveloping atmosphere of nitrogen. But it is not practicable to obtain ductile ferrous welds in an atmosphere of nitrogen for even when welding under laboratory conditions in a container or housing into which is passed a great excess of dry nitrogen of highest commercial purity, it has been found that the welds are, in eight cases out of ten, as brittle or more brittle than welds made in air. The nitrogen either directly or indirectly combines with the metal to form nitrides whose presence it is recognized is one of the principal causes of brittleness. The difficulty may be due to slight traces of oxygen brought into the gaseous medium or present in the work.

I have found that by adding a suitable quantity of an easily ionized chamically inactive gas, such as argon, to nitrogen it is possible to produce ductile welds with certainty and uniformity. It may be that the argon through its ready ionization insures the neutral nature of the mixture by preventing the nitrogen becoming active in the presence of the arc and forming compounds with the weld metal. Whatever the theory may be, it results that the dilution of the nitrogen by the argon enables the production of ductile welds. Welds produced in a mixture of 25% argon and 75% nitrogen have been found to be ductile. Mixture of argon and nitrogen containing up to 80% argon are readily and cheaply obtainable in the open market at the present time and the importance of welding in mixtures of argon and nitrogen is thus apparent from a commercial point of view.

In addition to welding in mixtures of hydrogen and argon and in nitrogen and argon, it will also be apparent that it is possible to weld in mixtures of argon, hydrogen and nitrogen where the constituent gases are present in suitable proportions.

My invention will be better understood from the following description when considered in connection with the accompanying drawing, and its scope will be pointed out in the appended claims.

Figure 2:
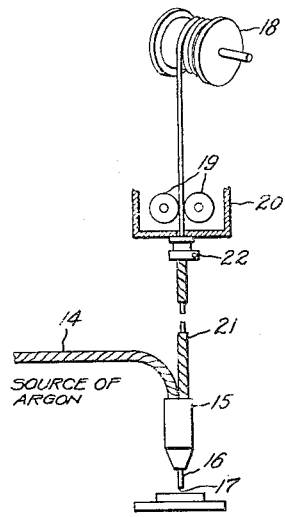

In the drawing, Fig. 1 diagrammatically represents my invention as applied to manual arc welding, and Fig. 2 represents my invention as applied to semi-automatic or automatic arc welding.

In Fig. 1, the work is shown as a pair of plates 1 and 2 and the electrode 3 is indicated as held by a suitable holder 4 adapted to be manipulated to cause the arc to be established or maintained between the electrode and the work during the welding operation. The electrode, which may be either a metallic or carbon electrode, is connected to a supply circuit through a reactor 5 and a resistor 6. A lead 7 is shown for connecting the work to the other side of the supply circuit. In order to simplify the drawing, the source is not shown, but it may be a constant potential source where a series stablizing resistor such as 6 is used. The source may be, however, an inherently regulated generator, which may supply the arc without the use of a stabilizing resistor. Hood 8 of suitable material, such as asbestos, is shown as covering the work. The hood may be of metal provided with a cover of asbestos or the like. It may be comparatively small and cover but a portion of the work. The hood has an open top which is only sufficiently large to permit the operator to manipulate the electrode readily. The gaseous medium is conducted to the hood through a conduit 9. This gaseous medium may be argon supplied from a container 10 through a valve 11 and a valve 12 to the conduit 9 and thence to the hood 8. If argon is to be used along with another gas, such as hydrogen, above referred to, the additional gas may be supplied from a source not shown, through valves 13 and 12 to the conduit 9 and thence to the hood 8. In place of hydrogen alone, a mixture of gases might be thus supplied and mixed with the argon supplied through valve 11. An amount of gaseous medium is supplied to the hood in all cases sufficient effectively to exclude the action of deleterious gases and to maintain the arc and heated portions of the work in the desired atmosphere.

In Fig. 2, I have illustrated my invention as applied to automatic or semi-automatic arc welding. In the arrangement shown, argon is supplied from a suitable source, not shown, through a flexible conduit 14, to a welding tool 15 from which it is discharged around the welding electrode 16 and the molten portions of the work 17. In place of argon, mixtures of other gases containing argon might likewise be supplied. In this figure, the electrode 16 is indicated as being drawn from a reel 18 by feed rollers 19 driven by any suitable means. The feed rollers are mounted in a suitable welding head 20. The electrode is delivered from the rolls 19 to the tool 15 by a flexible conduit 21. Welding current is supplied at 22 from any suitable source.

Any suitable means may be employed in carrying out the method of my invention, and the invention is applicable to any of the known forms of welding, whether performed by hand, semi-automatically, or wholly automatically. Composite electrodes of fluxes producing a slag which will float on the surface of the crater of the weld metal and prevent its rapid chilling may be used to advantage in certain cases where the weld metal readily absorbs the gaseous medium used. The slag or flux prevents the metal from cooling so rapidly as to prevent the escape of the dissolved gases from the weld metal and thus prevents porosity.

The application of Irving Langmuir, Serial No. 729,185, filed July 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

What I claim as new and desire to secure by Letters Patent of the United States is:—

1. The method of fusing metals by the electric arc process which includes the steps of maintaining the arc and supplying a small quantity of an easily ionized chemically inert gas having substantially the characteristics argon to the arc.

2. The method of fusing metals by the electric arc process which includes the steps of maintaining the arc and supplying a small quantity of argon to the arc.

3. The method of improving the character of welds produced by the electric arc process which includes the steps of maintaining the arc, melting the metal at the point of welding with said arc and supplying to the arc and molten portions of the metal a protecting atmosphere of argon.

4. The method of fusing metals by the electric arc process which includes the steps of maintaining the arc, melting the work at the point of welding with said arc and enveloping the arc and molten portions of the work with an active reducing gaseous medium containing an easily ionized chemically inert gas of substantially the same characteristics as argon.

5. The method of welding which includes the steps of maintaining an arc, melting the work at the point of welding with said arc and enveloping the arc and molten portions of the work with an active reducing medium comprising hydrogen and argon.

6. The method of welding which includes the steps of maintaining an arc, melting the metal at the point of welding with said arc and enveloping the arc and molten portions of the metal with a gaseous medium comprising nitrogen and a sufficient quantity of an easily ionized chemically inert gas to prevent nitrification of the weld metal by the nitrogen.

7. The method of welding which includes the steps of maintaining an arc, melting the work at the point of welding with said arc and enveloping the arc and molten portions of the work with a gaseous mixture of argon and nitrogen in which the amount of nitrogen present is not greatly in excess of three times the amount of argon present.

8. The method of welding which includes the steps of maintaining an arc, melting the work at the point of welding with said arc and enveloping the arc and molten portions of the work with an active reducing gaseous medium comprising hydrogen diluted with nitrogen and argon.

In witness whereof, I have hereunto set my hand this 23rd day of June, 1926.

PHILIP K. DEVERS.